US012656295B2

(12) United States Patent
Ueki et al.

(10) Patent No.: US 12,656,295 B2
(45) Date of Patent: Jun. 16, 2026

(54) RIBBON-TYPE ELECTRODE AND RIBBON-TYPE SENSOR

(71) Applicant: ABLIC Inc., Nagano (JP)

(72) Inventors: Takatsugu Ueki, Nagano (JP); Hitoshi Yoshida, Nagano (JP); Fumiyasu Utsunomiya, Nagano (JP); Kouichi Takahashi, Fukui (JP); Takayoshi Hishikawa, Fukui (JP)

(73) Assignee: ABLIC Inc., Nagano (JP)

( * ) Notice: Subject to any disclaimer, the term of this patent is extended or adjusted under 35 U.S.C. 154(b) by 141 days.

(21) Appl. No.: 18/411,029

(22) Filed: Jan. 12, 2024

(65) Prior Publication Data

US 2024/0241074 A1    Jul. 18, 2024

(30) Foreign Application Priority Data

Jan. 13, 2023    (JP) ................................ 2023-003659

(51) Int. Cl.
G01N 27/403 (2006.01)
G01N 27/04 (2006.01)
G01N 27/30 (2006.01)

(52) U.S. Cl.
CPC ......... G01N 27/403 (2013.01); G01N 27/048 (2013.01); G01N 27/30 (2013.01)

(58) Field of Classification Search
CPC .... G01N 27/403; G01N 27/048; G01N 27/30; G01N 27/26
See application file for complete search history.

(56) References Cited

U.S. PATENT DOCUMENTS

| | | | |
|---|---|---|---|
| 2011/0097624 A1* | 4/2011 | Bhatt | H01M 4/364 429/163 |
| 2019/0353550 A1* | 11/2019 | Park | B32B 3/08 |
| 2020/0256755 A1* | 8/2020 | Wakayama | G01M 3/165 |

FOREIGN PATENT DOCUMENTS

| | | | | |
|---|---|---|---|---|
| JP | 2018-173387 | 11/2018 | | |
| KR | 20120072506 A | * 7/2012 | | G01L 1/14 |
| WO | WO-2007059589 A1 | * 5/2007 | | H01M 50/136 |

OTHER PUBLICATIONS

Wang et al., Multifunctional Directional Water Transport Fabrics with Moisture Sensing Capability, ACS Applied Materials & Interfaces, 2019, 11, 22878-22884 (Year: 2019).*

* cited by examiner

*Primary Examiner* — Shizhi Qian
(74) *Attorney, Agent, or Firm* — JCIPRNET

(57) ABSTRACT

A ribbon-type electrode and a ribbon-type sensor are capable of long-term sensing. The ribbon-type electrode includes an electrode section, which contains a first electrode and a second electrode. The first electrode which contains a thin plate-like structure containing a first type of metal having a higher ionization tendency than hydrogen and the second electrode are disposed to face each other with respect to a plane formed by a length direction and a width direction of the first electrode with an insulating section made of nonconductive fibers interposed therebetween.

10 Claims, 6 Drawing Sheets

120

120A

120B

120C

RIBBON-TYPE ELECTRODE AND RIBBON-TYPE SENSOR

CROSS-REFERENCE TO RELATED APPLICATION

This application claims the priority benefits of Japanese application no. 2023-003659, filed on Jan. 13, 2023. The entirety of the above-mentioned patent application is hereby incorporated by reference herein and made a part of this specification.

BACKGROUND

Technical Field

The present invention relates to a ribbon-type electrode and a ribbon-type sensor.

Description of Related Art

A sensor which generates power between two types of electrodes respectively made of different types of metal wires and buried parallel to the longitudinal direction of a ribbon-shaped fabric in the case of the space between the electrodes being filled with water due to water leakage, etc. has been disclosed (for example, see Japanese Patent Application Laid-Open No. 2018-173387). Hereinafter, the above-mentioned conventional sensor is referred to as a "ribbon-type sensor" and is described.

In a conventional ribbon-type sensor, in the case of the space between the electrodes being filled with water, of the two types of electrodes, one of the electrodes, which is made of a metal with a high ionization tendency, ionizes and dissolves into water, leaving behind electrons. That is, the power generated between the electrodes corresponds to the dissolution of ionized metal into water. The conventional ribbon-type sensor contains electrodes made of metal wires, and the amount of metal that can dissolve into water is very small. In this way, the conventional ribbon-type sensor including electrodes which have a very small amount of metal has short sensing time.

The present invention is intended to provide a ribbon-type electrode and a ribbon-type sensor that enable long-term sensing compared to the conventional ribbon-type electrode and the ribbon-type sensor.

SUMMARY

According to an aspect of the present invention, a ribbon-type electrode includes an electrode section, which contains a first electrode and a second electrode. The first electrode which contains a thin plate-like structure containing a first type of metal having a higher ionization tendency than hydrogen and the second electrode are disposed to face each other with respect to a plane formed by a length direction and a width direction of the first electrode with an insulating section made of non-conductive fibers interposed therebetween.

According to an aspect of the present invention, a ribbon-type sensor includes the above-described ribbon-type electrode and a communication section driven by an electromotive force caused by moisture acting on the electrode section.

According to the present invention, the period during which sensing may be performed can be extended.

DESCRIPTION OF THE EMBODIMENTS

A ribbon-type electrode and a ribbon-type sensor according to an embodiment of the present invention will be described hereinafter with reference to the drawings.

Figure 1:
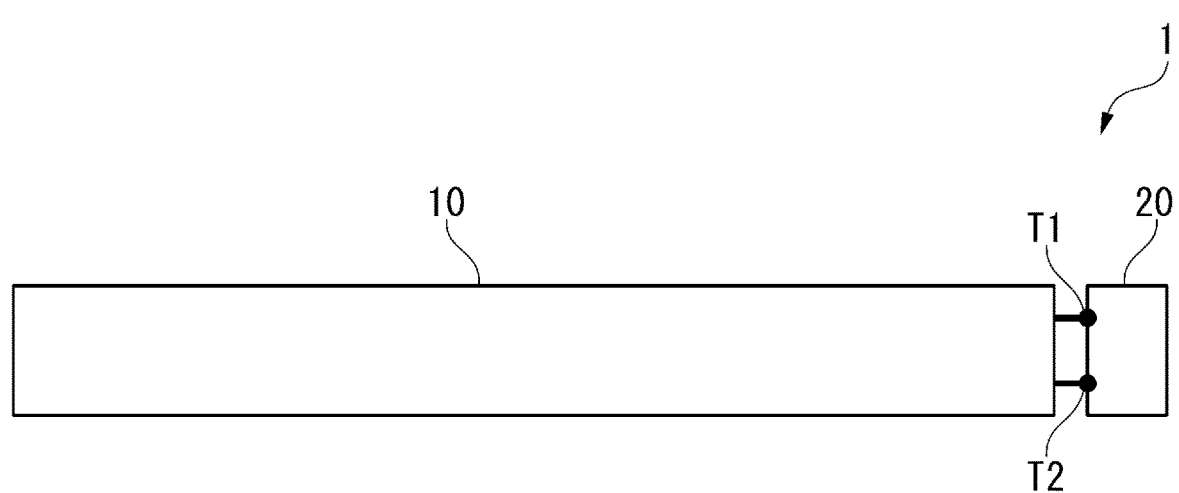
FIG. 1 is a schematic diagram schematically illustrating the configuration of a ribbon-type sensor according to an embodiment of the present invention.

FIG. 1 is a schematic diagram schematically illustrating the configuration of a ribbon-type sensor 1 serving as an example of a ribbon-type sensor according to the embodiment. The ribbon-type sensor 1 includes a ribbon-type electrode 10 and a controller 20.

The ribbon-type electrode 10 generates an electromotive force in response to moisture acting on an electrode section, and functions as a power source for the controller 20. The controller 20 is an electronic circuit driven by the electromotive force of the ribbon-type electrode 10.

Figure 2:
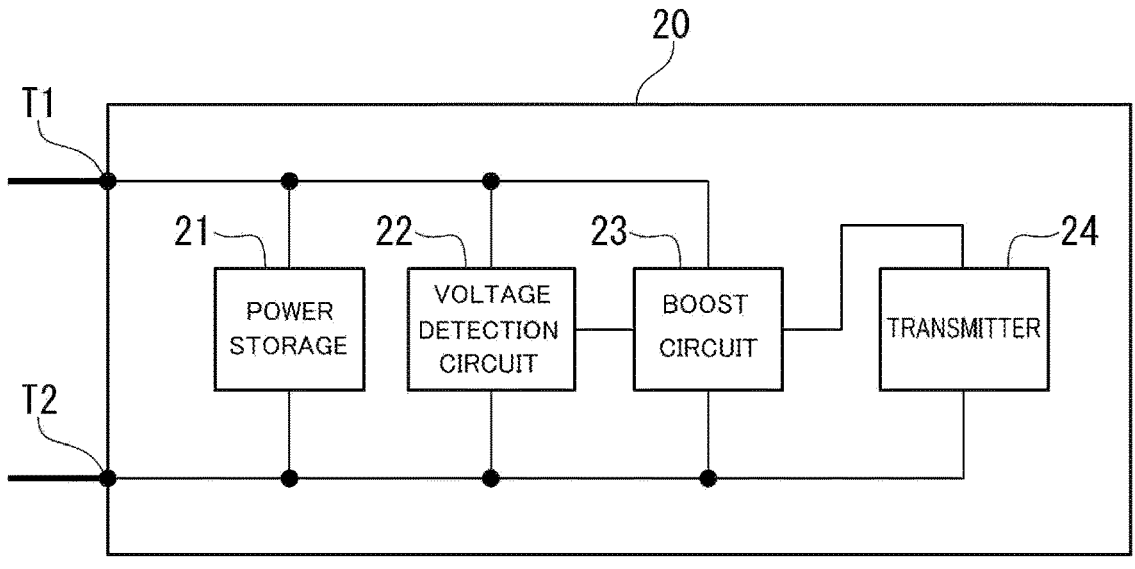
FIG. 2 is a block diagram illustrating an example of the configuration of a controller of the ribbon-type sensor according to the embodiment.

FIG. 2 is a diagram illustrating an example of the configuration of the controller 20. The controller 20 includes a power storage 21, a voltage detection circuit 22, a boost circuit 23, a transmitter 24, a power port T1, and a ground port T2, and operates by power supplied to the power port T1 and the ground port T2.

The power storage 21 includes, for example, a capacitive element, and stores power supplied from the ribbon-type electrode 10 via the power port T1 and the ground port T2. The voltage detection circuit 22 includes, for example, a comparator, and determines whether voltages at both ends exceed a predetermined threshold. In the case where the voltage detection circuit 22 determines that the voltages at the both ends of the power storage 21 exceeds the predetermined threshold, the voltage detection circuit 22 outputs a signal instructing the boost circuit 23 to perform a boosting operation. The boost circuit 23 includes, for example, a switched capacitor circuit, and boosts the voltages at the both ends of the power storage 21. In response to the voltage detection circuit 22 outputting a signal instructing the boost operation, the boost circuit 23 starts the boost operation and supplies the boosted power to the transmitter 24. The transmitter 24 includes, for example, a low-power wireless communication circuit and a wireless communication antenna, and transmits a wireless signal to a wireless receiving section included in another device.

That is, the ribbon-type sensor 1 transmits a wireless signal to another device in the case of moisture acting on the ribbon-type electrode 10. According to the ribbon-type sensor 1 configured in this way, the ribbon-type sensor 1 can function as a sensor which detects moisture by generating self power without receiving power from an external source or having a built-in battery.

Note that the wireless signal transmitted by the transmitter 24 may include identification information (for example, a sensor number) uniquely assigned to each of the ribbon-type sensors 1. According to the controller 20 configured in this way, other devices can identify which ribbon-type sensor 1 among the ribbon-type sensors 1 has transmitted the wireless signal from the identification information included in the wireless signal received from the transmitter 24 of the ribbon-type sensor 1.

In the case where a large number of the ribbon-type sensors 1 are disposed at various locations, and the ribbon-type sensor 1 which is the source of the wireless signal may be identified by the identification information included in the wireless signal, the ribbon-type sensor 1 which detected moisture can be identified based on the identification information. By associating the installation location of the ribbon-type sensor 1 with the identification information, where moisture is detected may be specified.

The configuration of the ribbon-type electrode 10, which is an example of a ribbon-type electrode according to an embodiment of the present invention, is described with reference to FIGS. 3 to 7.

Note that in the following description, in the case of indicating a direction being needed, the description is made using a three-dimensional orthogonal coordinate system of an X axis, a Y axis, and a Z axis. Here, the dimension in the direction along the X axis (hereinafter referred to as an "X direction") is referred to as a "width" of the ribbon-type electrode 10. The dimension in the direction along the Y axis (hereinafter referred to as a "Y direction") is referred to as a "length" of the ribbon-type electrode 10. The dimension in the direction along the Z axis (hereinafter referred to as a "Z direction") is referred to as a "thickness" of the ribbon-type electrode 10.

Figure 3:
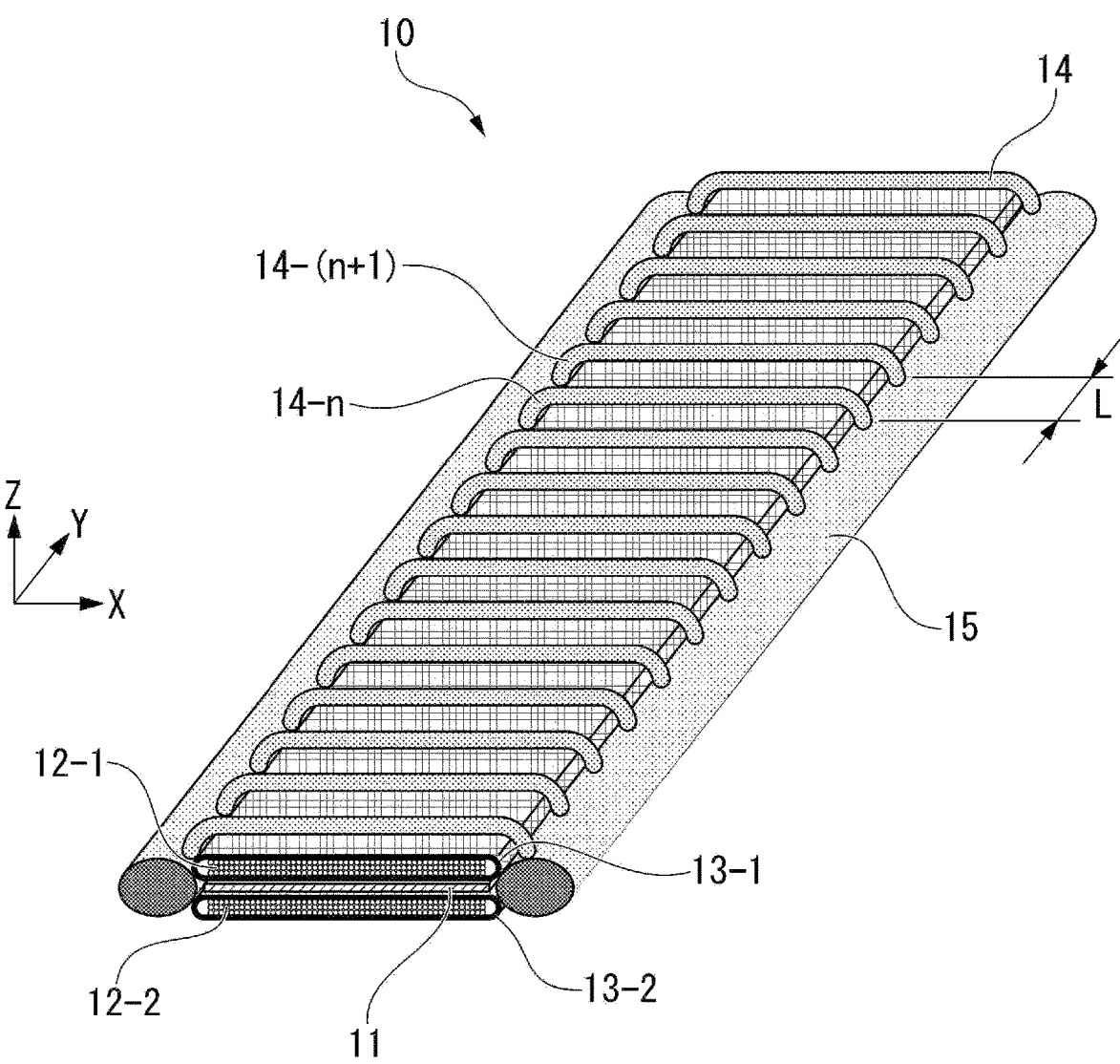
FIG. 3 is a perspective view illustrating an example of the appearance of the ribbon-type electrode of the embodiment.

FIG. 3 is a perspective view illustrating an example of the appearance of the ribbon-type electrode 10.

Figure 4:
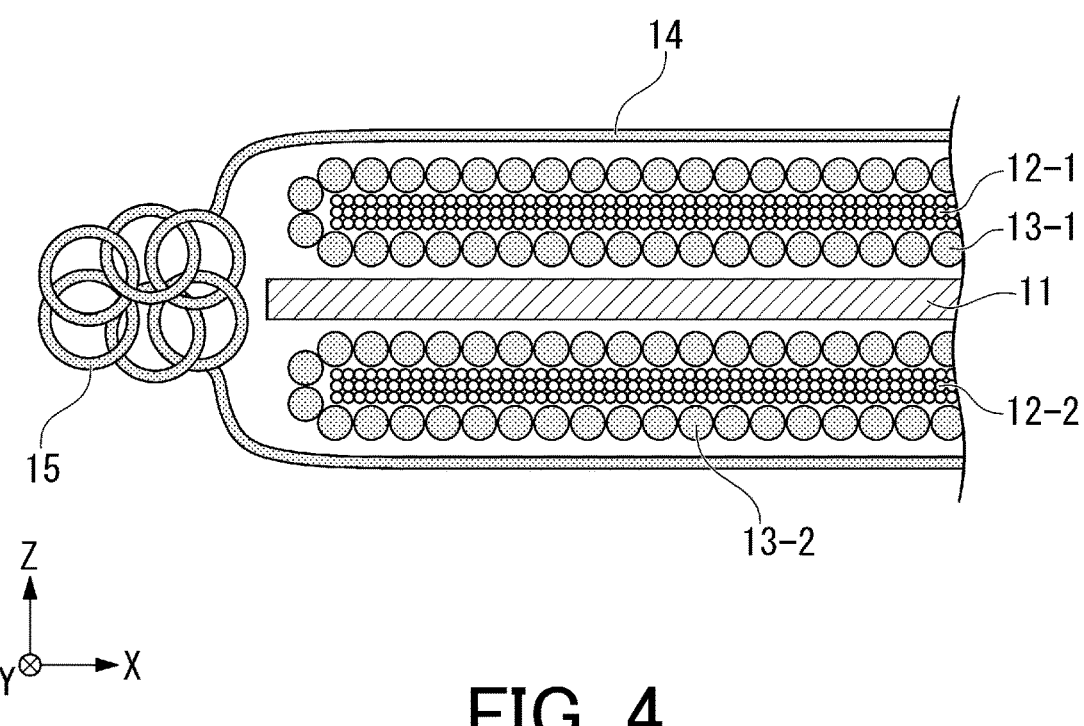
FIG. 4 is a cross-sectional view illustrating an example of the cross-sectional shape of the ribbon-type electrode of the embodiment.

FIG. 4 is a cross-sectional view illustrating an example of the cross-sectional shape of the ribbon-type electrode 10.

The ribbon-type electrode 10 has a width (dimension in the X direction), a length (dimension in the Y direction) which is larger than the width, and a thickness (dimension in the Z direction) which is smaller than the width. As an example of the size, the ribbon-type electrode 10 is formed to have a width of about 0.5 cm to 10 cm, a length of about 0.5 m to 10 m, and a thickness of about 1 mm to 20 mm. That is, the ribbon-type electrode 10 has an elongated external shape, such as a so-called ribbon shape (or band shape).

According to the ribbon-type electrode 10 containing an elongated external shape, the ribbon-type electrode 10 can be stored in a rolled shape, which can save space during storage and improve transportability during installation work. Further, because of containing an elongated shape, the ribbon-type electrode 10 can be installed by being wound around a structure such as a pipe.

The ribbon-type electrode 10 contains a first electrode 11, a second electrode 12, and an insulating section 13.

The insulating section 13 is made of non-conductive fibers. The material of the insulating section 13 may be any non-conductive material, for example, chemical fibers such as rayon, nylon, and polyester, and natural fibers such as cotton and silk.

Note that the insulating section 13 is exemplary made of fibers having high water absorption and water retention performance. Examples of fibers with high water absorption and water retention performance include chemical fibers such as rayon and natural fibers such as cotton and silk.

By adopting the insulating section 13, the first electrode 11 and the second electrode 12 can be brought closer to each other than in the case where the insulating section 13 is not used, without short-circuiting the first electrode 11 and the second electrode 12. The proximity of the first electrode 11 and the second electrode 12 makes it possible to fill the space between the first electrode 11 and the second electrode 12 with water using a small amount of water, and the detection sensitivity of the ribbon-type electrode 10 can be improved. Furthermore, since the ribbon-type electrode 10 can cause water droplets attached to the insulating section 13 to remain between the first electrode 11 and the second electrode 12, the space between the first electrode 11 and the second electrode 12 can be filled with water using a small amount of water. The water absorption and water retention performance of the insulating section 13 can improve the detection sensitivity of the ribbon-type electrode 10.

The first electrode 11 and the second electrode 12 are electrodes containing two types of metal which have different ionization tendencies. Of the two types of metal having different ionization tendencies, the first electrode 11 includes a first type of metal, and the second electrode 12 includes a second type of metal. The first type of metal is, for example, zinc. The second type of metal is, for example, silver.

In the example, the ribbon-type electrode 10 constitutes a battery in which the first electrode 11 containing zinc is the negative electrode and the second electrode 12 containing silver is the positive electrode. The battery has a structure in which the copper electrode of a voltaic battery is replaced with a silver electrode. The ribbon-type electrode 10 performs the same electrochemical reaction as a voltaic battery. Since the mechanism of action of a voltaic battery is well known, the description thereof is omitted.

In addition, in the following description, the case where the material of the first electrode 11 is zinc, and the material of the second electrode 12 is silver is demonstrated as an example, but is not limited thereto. For example, in the case where the metal of the first electrode 11, which has a higher ionization tendency than hydrogen, dissolves into water as metal ions, the first electrode 11 and the second electrode 12 may be made of any material as long as the electrodes undergo a reaction in which electrons remaining in the first electrode 11 combine with hydrogen ions in the second electrode 12. For example, the second electrode 12 may be a carbon electrode.

Figure 5:
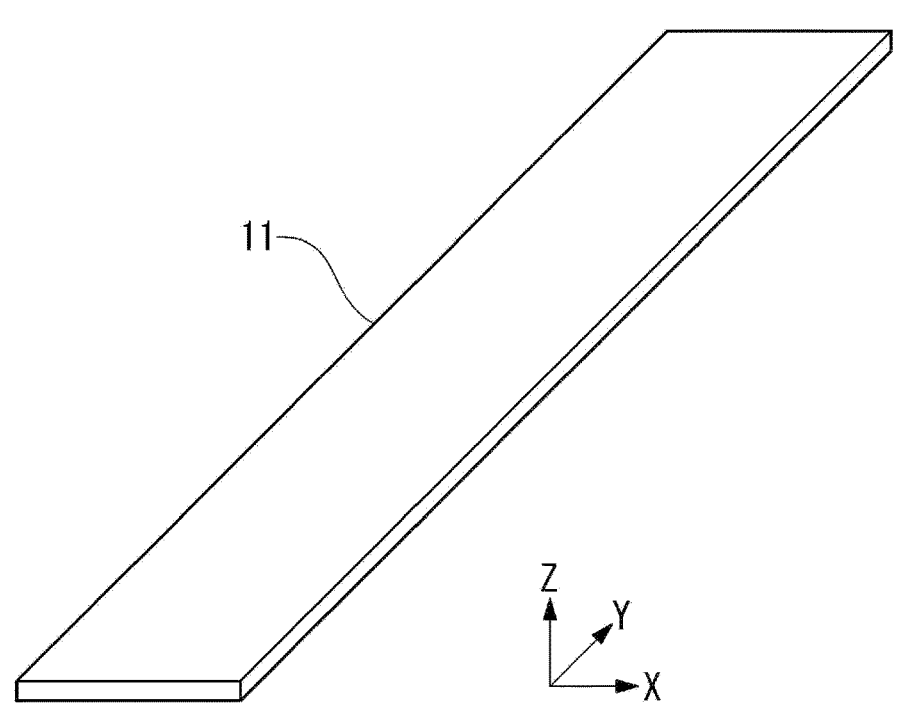
FIG. 5 is a perspective view illustrating an example of the shape of the first electrode of the ribbon-type electrode of the embodiment.

FIG. 5 is a perspective view illustrating an example of the shape of the first electrode 11. The first electrode 11 is made of a thin plate shape of zinc, as illustrated in FIG. 5. A thin plate shape means that the thickness (dimension in the Z direction) is smaller than the width (dimension in the X direction) and the length (dimension in the Y direction). As an example, the first electrode 11 has a width of about 1.0 mm to 10 mm, a length of about 0.5 m to 10 m, and a thickness of about 0.05 mm to 1.0 mm.

Figure 6:
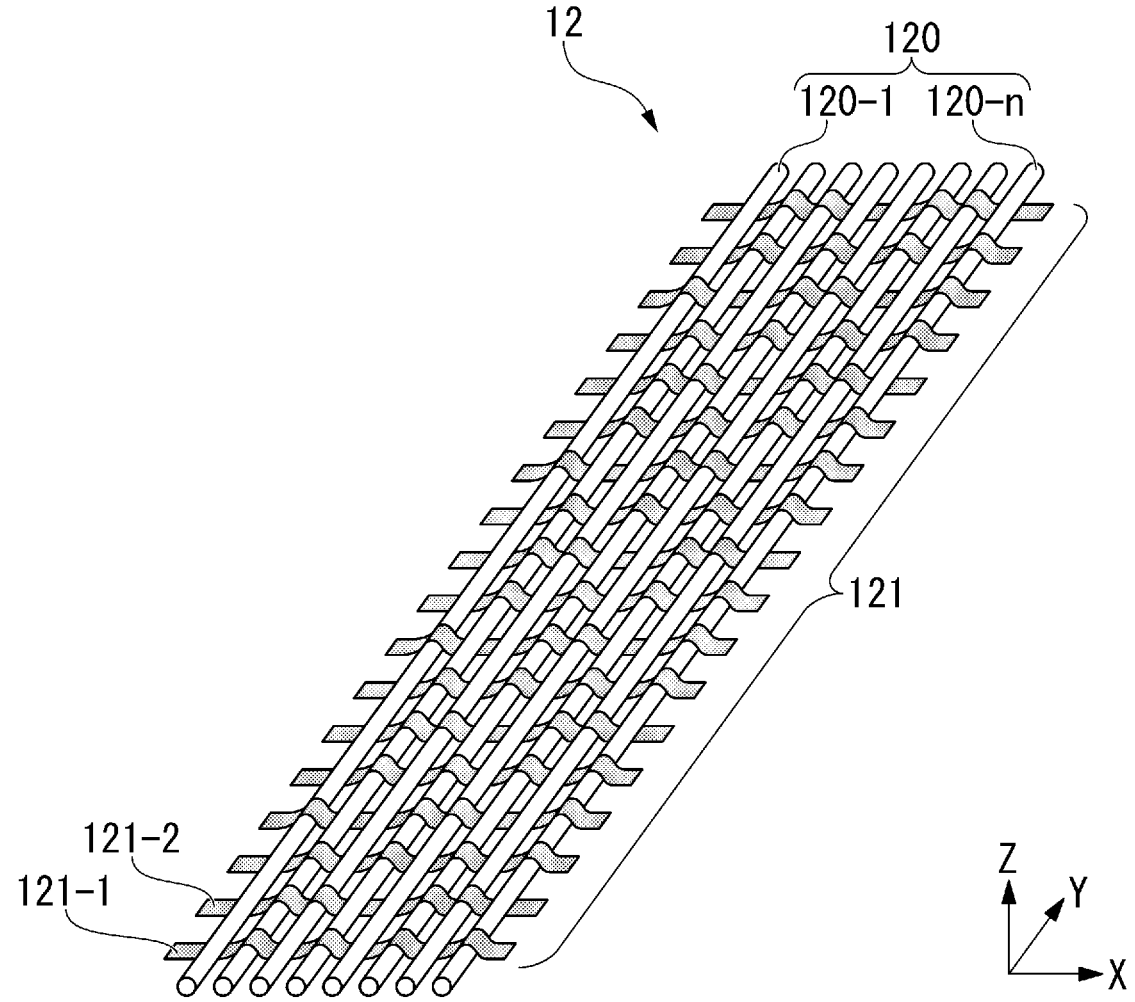
FIG. 6 is a perspective view illustrating an example of the shape of the second electrode of the ribbon-type electrode of the embodiment.

FIG. 6 is a perspective view illustrating an example of the shape of the second electrode 12. As illustrated in FIG. 6, the second electrode 12 uses thread-like silver as an electrode material 120. Thread-like silver refers to silver molded into a thread-like shape, or thread-like fibers (for example, chemical fibers such as nylon 6, 6) coated with silver. In the following description, thread-like silver is also referred to as a silver thread.

In an example of the embodiment, the second electrode 12 contains n silver threads as the electrode material 120, which has a textile structure in which electrode materials 120-1 to 120-n are arranged in the width direction (dimension in the X direction) as warp threads and woven in the X-axis direction and the Y-axis direction by multiple weft threads 121.

The length (dimension in the Y direction) of the electrode material 120, which is the warp thread, is sufficiently longer than the length (dimension in the X direction) of the weft thread 121. The second electrode 12 contains an external shape elongated in the Y direction, woven into a so-called ribbon shape or band shape.

Note that it is exemplary that the width of the second electrode 12 substantially matches the width of the first electrode 11. Here, substantially matching means that the width of the second electrode 12 is 0.5 times or more the width of the first electrode 11 and less than 1.5 times the width of the first electrode 11.

Figure 7:
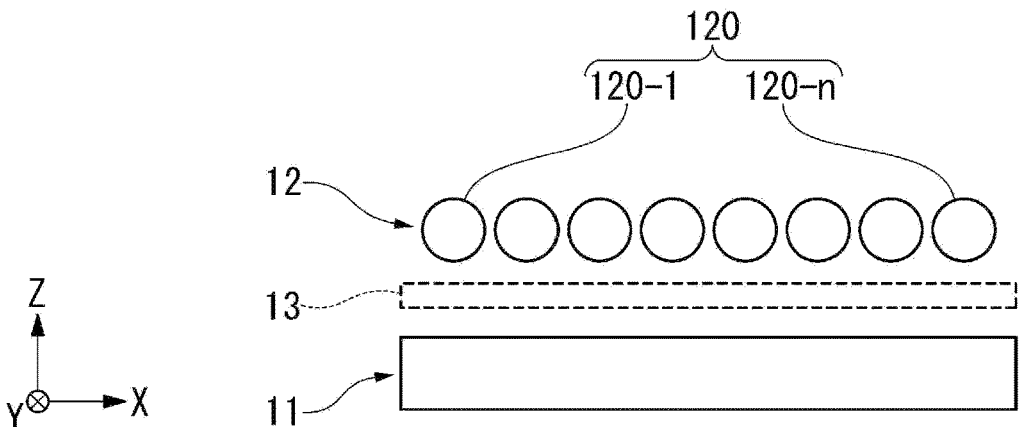
FIG. 7 is a front view of the ribbon-type electrode of the embodiment.

FIG. 7 is a front view of the ribbon-type electrode 10, and illustrates an example of a facing disposition of the first electrode 11 and the second electrode 12. As illustrated in FIG. 7, the second electrode 12 is disposed to face the first electrode 11 with the insulating section 13 interposed therebetween. The facing disposition means that a plane formed by the width and the length of the first electrode 11 (that is, an XY plane) and a plane formed by the width and the length of the second electrode 12 (that is, the XY plane) are disposed so as to face each other.

The ribbon-type electrode 10 (electrode section) has a structure in which of the two types of metal having different ionization tendencies, the thin plate-like first electrode 11 containing the first type of metal and the second electrode 12 in which the thread-like electrode materials 120 containing the second type of metal are arranged in a width direction of the first electrode 11 are disposed to face a plane formed by a length direction and the width direction of the first electrode 11 with the insulating section 13 made of non-conductive fibers interposed therebetween.

Note that, as illustrated in FIGS. 3 and 4, the second electrodes 12 may be disposed on both sides of the first electrode 11 in the Z direction. Here, in the case of looking at the plane (XY plane) of the first electrode 11 from the side where a Z value (which is larger than zero) is large to a side where the Z value is small, the surface which can be seen in the front is referred to as a front surface of the first electrode 11, and the invisible surface in the back is referred to as a back surface of the first electrode 11.

Of the second electrodes 12, the one disposed on a front surface side of the first electrode 11 is referred to as a front second electrode 12-1, and the one disposed on a back surface side of the first electrode 11 is referred to as a back second electrode 12-2.

Among the insulating sections 13 disposed between the first electrode 11 and the second electrode 12, the one disposed between the first electrode 11 and the front second electrode 12-1 is referred to as a front insulating section 13-1, and the one disposed between the first electrode 11 and the back second electrode 12-2 is referred to as a back insulating section 13-2.

That is, the ribbon-type electrode 10 (electrode section) includes the second electrodes 12 (specifically, the front second electrode 12-1 and the back second electrode 12-2) on the front surface side and the back surface side of the first electrode 11, respectively.

According to the ribbon-type electrode 10 in which the second electrodes 12 are disposed to face the first electrode 11 on both sides in the Z direction, that is, in the thickness direction, compared to the case where the second electrode 12 is disposed to face one side of the first electrode 11, the facing area of the first electrode 11 and the second electrode 12 can be increased without increasing the width of the ribbon-type electrode 10. Thus, not only can the moisture detection ability be improved, but also the life of the battery formed by the first electrode 11 and the second electrode 12 can be substantially extended, and the sensing time of the ribbon-type sensor 1 can be extended.

Further, according to the ribbon-type electrode 10 in which the second electrodes 12 are disposed to face the first electrode 11 on both sides in the thickness direction, since moisture can be easily absorbed from both sides of the ribbon-type electrode 10, the moisture detection ability can be improved.

Note that, as illustrated in FIG. 4, the insulating section 13 may be configured to wrap the second electrode 12 with a woven fabric (or knitted fabric) made of non-conductive fibers. In this case, the insulating section 13 is a cylindrical structure (hereinafter referred to as a "cylindrical body") which is flat in the X direction, and by housing the second electrode 12 inside the cylindrical body, the insulating section 13 is configured to wrap around the second electrode 12.

According to the ribbon-type electrode 10 configured in this way, moisture adhering to an outer side of the second electrode 12 (a side of a plane of the second electrode 12 other than the plane facing the first electrode 11) can be drawn to the side of the plane facing the first electrode 11 by the cylindrical insulating section 13. Thus, according to the ribbon-type electrode 10 configured in this way, even if moisture adheres to the outer side, by attracting moisture to the side of the facing plane of the first electrode 11 and the second electrode 12, charge transfer between the first electrode 11 and the second electrode 12 can be generated. Thus, according to the ribbon-type electrode 10, the moisture detection ability can be improved.

Further, as illustrated in FIGS. 3 and 4, the ribbon-type electrode 10 includes a bundling thread 14 and a selvage thread 15. The bundling thread 14 and the selvage thread 15 maintain a relative position (for example, an interval in a facing disposition direction) of the first electrode 11 and the second electrode 12 that are stacked with the insulating section 13 interposed therebetween. Both the bundling thread 14 and the selvage thread 15 are made of non-conductive fibers.

Note that the bundling thread 14 and the selvage thread 15 may be integrally formed by knitting yarns together, and the bundling thread 14 may be prepared as a separate part from the selvage thread 15 and combined with the selvage thread 15.

Further, in the embodiment, an example of the configuration in which the bundling thread 14 is made of knitted yarns has been described, but the present invention is not limited thereto, and may be made of, for example, a tape-shaped fabric or a resin plate.

The bundling threads 14 are disposed in the width direction (X direction) of the ribbon-type electrode 10 at a predetermined interval in the length direction (Y direction) of the ribbon-type electrode 10. For example, the n-th bundling thread 14 (bundling thread 14-n) and the n+1-th bundling thread 14 (bundling thread 14-(n+1)) are disposed with an interval L therebetween.

That is, the bundling threads 14 (bundling section) are disposed in the width direction of the ribbon-type electrode 10 (electrode section) at the predetermined interval in the length direction of the ribbon-type electrode 10 (electrode section), and the interval between the first electrode 11 and the second electrode 12 in the facing disposition direction is maintained.

Here, if moisture adheres to the bundling thread 14 or the selvage thread 15, the moisture may tend to move in the direction in which the fibers are knitted. If the bundling thread 14 is knitted in the length direction (Y direction) of the ribbon-type electrode 10, moisture attached to the bundling thread 14 and the selvage thread 15 becomes easier to move in the length direction (Y direction).

According to the ribbon-type electrode 10 in which the bundling threads 14 are disposed at the predetermined interval L in the length direction (Y direction), not only can the attached moisture penetrate into the interior without being hindered by the bundling threads 14, but the attached moisture is also difficult to move in the length direction (Y direction). Thus, the ribbon-type electrode 10 can easily retain attached moisture between the first electrode 11 and the second electrode 12, and can improve the moisture detection ability.

Although the second electrode 12 has been described so far as being configured using the thread-like electrode material 120 elongated in the length direction (Y direction) as a warp thread, as illustrated in FIG. 6, the second electrode 12 is not limited thereto. The second electrode 12 may be configured using a combination of multiple electrode materials 120 as warp threads. Further, the second electrode 12 may be made of a thin plate-like electrode material made of a single electrode material or multiple electrode materials.

Figure 8:
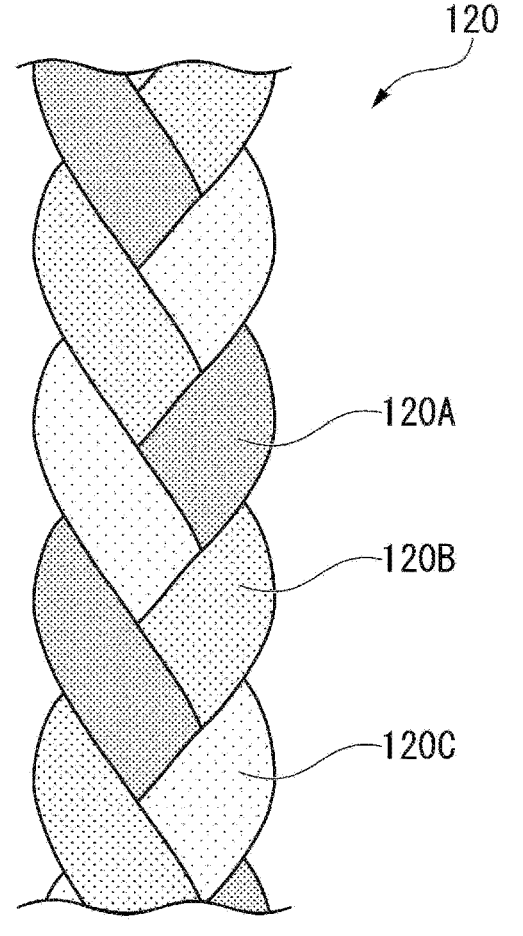
FIG. 8 is a schematic diagram illustrating an example of the shape of the electrode material of the ribbon-type electrode of the embodiment.

FIG. 8 is a perspective view illustrating an example of the shape of the electrode material 120. In the case of the shape illustrated in FIG. 8, the warp thread is a knitted wire in which three electrode materials 120 (a first electrode material 120A, a second electrode material 120B, and a second electrode material 120C) are knitted together (that is, in a braided structure).

Figure 9:
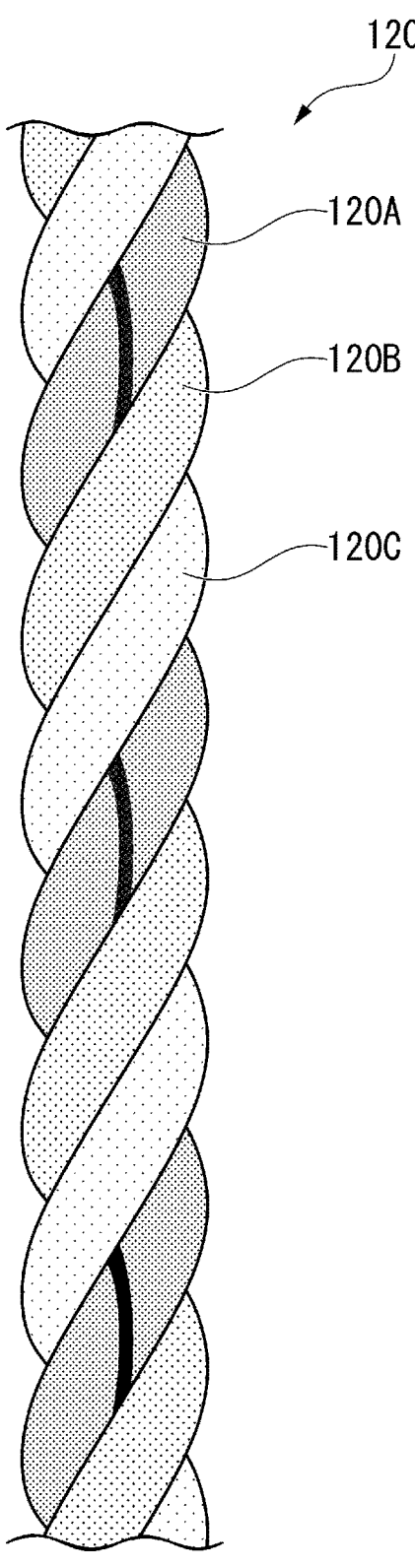
FIG. 9 is a schematic diagram illustrating another example of the shape of the electrode material of the ribbon-type electrode of the embodiment.

FIG. 9 is a perspective view illustrating another example of the shape of the electrode material 120. In the case of the shape illustrated in FIG. 9, the warp thread is a twisted wire formed by twisting three electrode materials 120 (the first electrode material 120A, the second electrode material 120B, and the second electrode material 120C) (that is, in a three-stranded structure).

That is, the second electrode 12 may be constructed by weaving a stranded wire or knitted wire obtained by twisting multiple thread-like electrode materials 120 together as a warp thread in the length direction of the ribbon-type electrode 10 (electrode section) and a weft thread 121 in the width direction of the ribbon-type electrode 10 (electrode section), and by arranging multiple electrode materials 120 in the width direction of the first electrode 11.

According to the ribbon-type electrode 10 using the second electrode 12 configured in this way, the surface area of the second electrode 12 can be increased while maintaining flexibility in the length direction (Y direction).

Here, in the case of increasing the surface area of the second electrode 12, for example, like stockinette knitting, it is also conceivable to adopt a configuration in which multiple stages are provided in the X direction and the electrode materials 120 between adjacent stages are intertwined and knitted.

However, in the case of the electrode materials 120 being knitted in such a way by being intertwined between rows, the electrode material 120 draws a loop with a small radius in each of stitches. Once the electrode material 120 draws the loop with a small radius, the metal constituting the electrode material 120 may become fluffy (or flaky). If the metal of the electrode material 120 becomes fluffy, the fluffed metal may penetrate through the insulating section 13. If the first electrode 11 and the second electrode 12 come into contact, the ribbon-type electrode 10 mayo longer function as a battery, and moisture may not be detected. In response to the electrode material 120 drawing a loop with a small radius for each of the stitches, it may be exemplary to form the insulating section 13 with sufficient density, strength, or thickness to prevent penetration.

The second electrode 12 of the ribbon-type electrode 10 has a structure in which multiple electrode materials 120 are twisted or knitted as the warp thread and woven with the weft thread 121, so there is no mesh like stockinette knitting, and the electrode material 120 does not draw a small radius loop.

Thus, according to the ribbon-type electrode 10 of the embodiment, fuzzing of the electrode material 120 can be suppressed, the fluffy metal thread may be prevented from penetrating the insulating section 13 and coming into contact with the first electrode 11. Alternatively, the electrode material 120 may be press-molded (calendered) using a heated metal plate. In this way, fluffing can be further suppressed. Furthermore, the insulating section 13 may be formed by fibers including a woven structure or a fabric structure, and the fibers have a non-conductive (insulative) property. In a case where the insulating section 13 is exemplary to be a fine woven or knitted fabric using insulating fibers, the fluffy metal thread is prevented from penetrating the insulating section 13 and from coming into contact with the first electrode 11. According to the ribbon-type electrode 10 configured in this way, battery defects may be prevented and the life of the battery may be extended due to the first electrode 11 and the second electrode 12, the manufacturing cost of the ribbon-type sensor 1 can be reduced, and the sensing time can be extended.

As described above, in the ribbon-type sensor 1, since the first electrode 11 is formed into a thin plate shape, both flexibility and strength in the length direction (Y direction) may be achieved, for example, the volume of the metal constituting the electrode can be increased compared to the case where a thread-like or metal foil-like electrode shape is adopted.

Further, in the ribbon-type sensor 1, the second electrode 12 is configured in a tape shape using threads, compared to the case where the second electrode 12 is also made into a thin plate shape, not only the flexibility in the length direction (Y direction) can be improved, but also the surface area of the second electrode 12 can be increased.

According to the ribbon-type sensor 1 in which the first electrode 11 is made into a thin plate shape and the second electrode 12 is made into a tape shape using threads, both mechanical properties such as flexibility and strength and electrochemical properties such as battery life may be achieved.

Although an embodiment of the present invention has been described above, the present invention is not limited to the above-described embodiment, and can be modified as appropriate without departing from the spirit thereof. For example, in addition to wire materials such as metal wires and conductive threads, the configuration may also be made from planar members such as metal foils and net materials.

Further, without departing from the spirit of the present invention, the components in the above-described embodiment may be replaced with well-known components as appropriate, and the above-mentioned modifications may be combined as appropriate.

What is claimed is:

1. A ribbon-type electrode, comprising:

an electrode section, containing a first electrode and a second electrode, the first electrode containing a thin plate-like structure which contains a first type of metal having a higher ionization tendency than hydrogen and the second electrode being disposed to face each other with respect to a plane formed by a length direction and a width direction of the first electrode with an insulating section made of non-conductive fibers interposed therebetween, and bundling sections, bundling the first electrode and the second electrode to maintain an interval in a direction in which the first electrode and the second electrode are disposed to face each other, wherein the bundling sections are disposed in a width direction of the electrode section at a predetermined interval in a length direction of the electrode section.

2. The ribbon-type electrode according to claim 1, wherein the insulating section is made of the non-conductive fibers with water absorption and water retention performance.

3. The ribbon-type electrode according to claim 1, wherein the second electrode is structured by weaving a stranded wire or a knitted wire obtained by twisting a plurality of thread-like electrode materials together as a warp thread in the length direction of the electrode section and a weft thread in the width direction of the electrode section, and by arranging the plurality of thread-like electrode materials in the width direction of the first electrode.

4. The ribbon-type electrode according to claim 3, wherein the insulating section is made of the non-conductive fibers containing a woven or knitted structure.

5. The ribbon-type electrode according to claim 1, wherein the insulating section wraps the second electrode.

6. The ribbon-type electrode according to claim 1, wherein the electrode section comprises the second electrode on a front surface side and a back surface side of the plane of the first electrode, respectively.

7. A ribbon-type sensor, comprising:

the ribbon-type electrode according to claim 1; and a communication section, driven by an electromotive force caused by moisture acting on the electrode section.

8. The ribbon-type electrode according to claim 1, wherein the second electrode has a textile structure in which electrode materials are arranged in the width direction of the electrode section as warp threads and woven in the width direction and the length direction of the electrode section by multiple weft threads.

9. The ribbon-type electrode according to claim 1, wherein the thin plate-like structure of the first electrode extends in the length direction of the electrode section.

10. The ribbon-type electrode according to claim 1, wherein the insulating section forms a cylindrical woven structure enclosing the second electrode therein, the cylindrical woven structure being disposed on a surface of the thin plate-like structure of the first electrode.

* * * * *